Aug. 28, 1945. A. W. FLEER 2,383,784
COPPER AMMONIUM ACETATE EXTRACTION AND PURIFICATION METHOD
Filed March 25, 1944
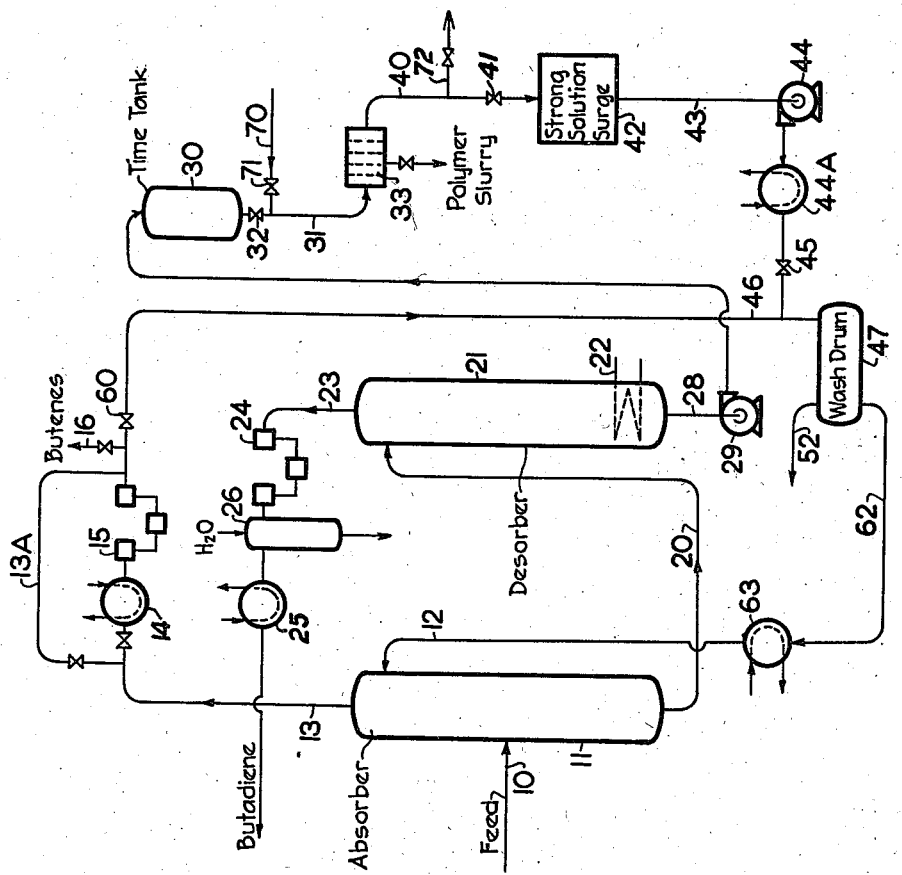
Inventor: Alfred W. Fleer
By his Attorney:

UNITED STATES PATENT OFFICE 2,383,784

COPPER AMMONIUM ACETATE EXTRACTION AND PURIFICATION METHOD

Alfred W. Fleer, San Francisco, Calif., assignor to Shell Development Company, San Francisco, Calif., a corporation of Delaware Application March 25, 1944, Serial No. 528,145

14 Claims. (Cl. 260—438)

The present invention relates to the production of butadiene and the like and pertains more particularly to improved methods of separating butadiene from mixtures containing butadiene along with butenes, acetylenes, etc., by selective absorption in copper ammonium acetate solutions. The invention is especially concerned with improved methods of removing acetylenes, particularly low boiling acetylenes, and like impurities from the absorbing solution.

Processes of producing butadiene are now in operation, wherein butadiene is absorbed from mixtures containing it along with butenes, low boiling acetylenes, etc., by contacting the mixture with copper ammonium acetate solution, the butenes being rejected by the absorbing solution. The butadiene is then freed from the enriched copper ammonium acetate solution (i. e., "rich solution") by heating in a desorbing zone. Then the substantially butadiene-free copper ammonium acetate solution (i. e., "lean solution") is returned to the butadiene-absorbing zone. Acetylenes, if present, are also absorbed by the copper ammonium acetate solution and tend to remain therein throughout the step of butadiene desorption and are thus recirculated. When the concentration of the lower acetylenes, such as methyl, ethyl and propyl acetylenes, in the absorbing solution reaches a certain point, the acetylenes will be freed with the butadiene in the desorbing zone, thereby contaminating the butadiene product. When the concentration of acetylenes in the butadiene product is above about 0.10% by weight, the butadiene product is unsatisfactory for polymerization with styrene and the like in the formation of synthetic rubber. In some cases, it has been found that the lean solution leaving the desorbing zone contains a valuable although relatively small amount of butadiene, which is lost in the subsequent lean solution treatment for acetylene removal.

It is therefore an object of this invention to provide an improved copper ammonium acetate absorption and purification method for the production of high quality butadiene from mixtures containing butadiene along with butenes, small amounts of acetylenes, particularly lower acetylenes, and other impurities.

It is a special object of this invention to provide an improved method of purification of substantially butadiene-free copper ammonium acetate solutions by removing acetylenes and other undesirable impurities.

It is a further object of the present invention to provide an improved copper ammonium acetate extraction method for butadiene, wherein the conditions in the desorbing zone are maintained such as to reduce to a minimum the loss of butadiene in the lean solution leaving the desorbing zone.

The above and other objects of this invention will be readily apparent from the following description taken in reference to the drawing, which represents a simplified schematic flow diagram of a copper ammonium acetate extraction and purification system.

Briefly, the process of the present invention comprises selectively absorbing butadiene and lower acetylenes, such as methyl-, ethyl-, propyl-, etc., acetylenes, from a mixture containing these components along with butenes, etc., in an aqueous copper ammonium acetate solution, and rejecting the butenes as raffinate, subsequently desorbing the solution at a temperature of about 160°–200° F. and at a pressure below the condensing pressure of butadiene at atmospheric temperature, preferably at a pressure of 10 to 20 p. s. i. to release substantially completely the butadiene from the rich solution. Thence, the desorbed lean solution, which still contains the bulk of the acetylenes, is subjected to conditions resulting in the polymerization of the acetylenes, and the solid polymers formed thereby are filtered out, preferably in an enclosed pressure filter. Thereafter, liquid polymers are removed from the lean solution by washing it with an aliphatic, preferably unsaturated, hydrocarbon, or mixture containing same and preferably with butene raffinate rejected in the butadiene absorption step. The washed, lean solvent is then recycled to the absorbing zone for absorption of butadiene and acetylenes.

By means of the improved method of the present invention there is obtained a higher yield of butadiene of higher purity and especially of decreased acetylene content. The removal of liquid acetylene polymers and other undesirable and accumulating impurities from the lean solution by means of an aliphatic unsaturated hydrocarbon is especially advantageous when applied to vapor phase absorption systems, although advantages are obtained when this removal step is applied to liquid-liquid absorptions, particularly where it is desired to obtain a relatively pure butene raffinate. The combination of first filtering in an enclosed pressure filter the lean solution which has been subjected to conditions favorable to acetylene polymerization, and thereafter treating the filtered lean solution with an aliphatic unsaturated hydrocarbon is particularly effective in removing acetylene and other polymers as well as other impurities, including some of unknown character which tend to cause the formation of emulsions.

Suitable aqueous copper ammonium acetate solutions generally comprise 9.5–11.5 molar (i. e., gram mols/liter) of ammonia, 3.0–3.3 molar total copper (including 0.2–0.4 molar cupric), and 3.5–4.5 molar acetate (calculated as acetic acid).

As has been indicated, the absorption of butadiene by aqueous copper ammonium acetate solution may be from a hydrocarbon feed in the vapor or liquid state. In liquid phase absorption a series of stages may be used, each stage comprising a mixer and a settler or other staging device, such as discrete stage tray contactors, the temperature increasing and the pressure gradually decreasing through said stages. For example, the first stage may be operated at 5–15° F. and 20–40 p. s. i., the penultimate stage may operate at 20–30° F. and 10–20 p. s. i., and the last stage, acting as a liquid phase butene rejection or partitioning rectifier, may operate at 65–80° F. and 60–75 p. s. i. In vapor phase absorption, a suitable column or columns providing a large surface contact between descending liquid absorbing solution and rising hydrocarbon vapor is generally used.

The butadiene is desorbed at a relatively low pressure from the butadiene-enriched copper ammonium acetate solution in a desorbing zone, which may comprise a packed or plate column or columns having means for increasing the temperature of the solution as it nears the end of its passage through the desorbing zone.

Conditions in the desorption zone are usually limited by two main considerations: (1) the maximum temperature to which the copper ammonium acetate solution can be heated without decomposition, i. e., about 180°–200° F.; and (2) the maintenance of sufficient pressure in the desorber to overcome the pressure drop through water scrubbing facilities (necessary to remove ammonia) etc., between the desorber and condensing zone and to obtain a pressure in said condensing zone sufficient to liquify butadiene vapor at a temperature above ice formation, preferably between 40–60° F. For example, when said condensing temperature is about 49° F., the condensing pressure will be about 10 p. s. i., thereby necessitating a higher desorber pressure of about 20 p. s. i. or higher. When operating between these limitations, it has been found to be quite difficult to remove substantially all of the butadiene. Residual butadiene in the solution tends to polymerize together with the acetylenes in the subsequent polymerization step and thereby is lost. To reduce this loss, it is a feature of this invention to maintain a pressure in the desorber substantially lower than the pressure necessary to force the butadiene to the condensing zone, namely at about 8–18 p. s. i. gauge or lower, and preferably about 10–12 p. s. i., and to boost the desorbed butadiene vapor back to a pressure, such as 20 p. s. i., sufficient to overcome the pressure drop due to water scrubbing facilities and to retain the pressure in the condensing zone sufficient to obtain liquefaction above ice formation temperatures. In this manner it has been possible to reduce the butadiene loss from about 1% to a negligible quantity of less than about 0.04%.

The bottom temperature in the desorber should not be lower than about 160° F.

The butadiene-free lean solution is then transferred from the desorbing zone to a polymerizing zone, wherein acetylene, other polymerizable impurities and changeable materials are subjected to polymerization conditions of about 60–80 p. s. i. and 165–195° F. for 50 to 100 minutes. The time period desirable in the polymerizing zone determines the size of the vessels used for this purpose, and depends on the temperature employed and the amount of acetylenes and other reactive impurities present. For example, with a feed to the absorbing zone containing 2.7% by weight of acetylenes a time period of about 80 minutes at about 180° F. is found desirable.

In the next step, the lean solution, which has been subjected to polymerization conditions, is passed through a suitable filter, preferably an enclosed pressure filter, such as, for example, a Sweetland filter, whereby solid polymers and other solid materials are removed. It is usually advantageous to precoat the filter members with a filter-aid or to continuously add a small amount of filter-aid to the lean solution before filtration or to do both. Suitable filter-aids comprise diatomaceous earth, expanded vermiculite, hulls of various grains, etc. By way of example, the filter membranes may be coated with about eight pounds of diatomaceous earth per hundred square feet of filtering area. A suitable amount of diatomaceous earth to be continuously added to the solution is, for example, one-quarter pound per gallon of solution.

The filtered lean solution after cooling to about 90°–100° F. then preferably passes from the filter to an extraction zone, wherein liquid acetylene polymers and other extraneous hydrocarbon-soluble materials are removed by contacting it with an aliphatic, preferably unsaturated, hydrocarbon liquid. Preferred are low molecular weight unsaturated hydrocarbons having about 4–10 carbon atoms and relatively low viscosities. Butene raffinate produced in the process is eminently suitable and very convenient, as it makes unnecessary the importation of outside wash hydrocarbons. Generally 0.1–10%, and preferably 0.5–5%, of this raffinate based on the volume of the solution to be treated is a suitable amount. The net amount of liquid polymers formed per pass, i. e., the amount of liquid polymers additionally formed in the polymerization zone, is substantially all removed by the washing liquid. For example, the amount of acetylene polymer in the lean solution leaving the extraction or washing zone may be maintained at about 0.10% by weight, and the amount of acetylene polymer in the lean solution entering the washing zone may be about 0.20%.

The purified solution freed of acetylenes, emulsifying materials, and other impurities may be cooled and recycled to the absorbing zone.

In the above process, it is periodically necessary to remove the accumulated solids or filter cake from the filters in order that a reasonably low pressure differential across the filter plates is maintained. However, since there is a considerable amount of residual copper ammonium acetate solution held up in the filter cake and filter, a relatively large amount of the expensive copper ammonium acetate solution would be lost if the filter cake were removed without first displacing and washing it with an aqueous $NH_3$ solution and then washing it with water.

Copper ammonium acetate contained in the combined wash waters is recoverable by the process described in my copending application, Serial No. 528,144, filed March 24, 1944, dealing with a method for concentrating dilute aqueous copper ammonium acetate solutions.

Referring now to the drawing, a hydrocarbon feed mixture, such as a cracked C4 fraction containing butadiene, butenes and minor amounts of lower acetylenes, which are mainly methyl and ethyl acetylenes, is introduced either as vapor or liquid through line 10 into the middle of the absorber 11 and passes countercurrently to downward flow of the aqueous copper ammonium acetate solution, which is introduced near the top of the absorber 11 through line 12. The butenes and paraffins are not absorbed by the solution and pass out the top of the absorber 11 through line 13. This butene raffinate, if vaporous, if preferably cooled in cooler 14 and compressed to liquid form in compressor 15 and may be disposed of through line 16. If liquid, the raffinate may bypass the compressor through line 13A.

The butadiene and acetylenes present are absorbed in the solution and pass out the bottom of the absorber 11 through line 20 into the upper portion of the desorber 21. There the butadiene is vaporized at a relatively low pressure, i. e., preferably below 18 p. s. i. and especially at 10–12 p. s. i. by heating by means of a heating element 22 in the bottom portion of the desorber 21. The vaporized butadiene passes out through top line 23, compressor 24, water scrubber 26, which is necessary to remove ammonia from the product, and condenser 25. The butadiene is liquefied in condenser 25 at a temperature above 32° F. in order to avoid ice formation due to water entrained in the water scrubber 26.

The lean solution which contains the absorbed acetylene is withdrawn from the desorber 21 through bottom line 28 by means of a pump 29 and passes to a time tank 30 (or series of time tanks). There it is held at a temperature of about 160–200° F., preferably about 180° F., under its own pressure (about 60 to 80 p. s. i.) for about 50 to 100 and preferably about 70–90 minutes. The exact length of time depends on the amount and nature of acetylenes present, sufficient time being provided to polymerize the acetylenes to liquid and solid polymers and thereby to prevent acetylenes from accumulating to amounts sufficient to cause undesirable contamination of the butadiene product.

The polymer-containing lean solution proceeds from the time tank 30 through line 31 and valve 32 to a filter 33, wherein the solid polymers and other solid impurities are removed from the solution. For continuous flow, a plurality of filters in parallel with accompanying lines and valves adapted for shutting off one or more filters are used.

The solid-free lean solution then passes from the filter 33 through line 40, valve 41, strong solution surge tank 42, line 43, pump 44, valve 45 and line 46 into wash drum 47, wherein it is thoroughly contacted with butene raffinate. The latter is taken from line 16 through valve 60 in line 46. Purified lean solution passes out the bottom of the wash drum 47 and returns through line 62, cooler 63 and line 12 to the absorber 11. The butenes containing dissolved impurities are discharged from tank 47 through line 52.

In the filtering operation, because of its semi-continuous nature, it is necessary to recover solution from the filters before disposing of the accumulated solids or filter cake. Solution is removed from the filter after shutting valve 32 by displacement with aqueous ammonia of at least 5% by weight strength, from a suitable source through line 70 and valve 71. The dilute copper ammonium acetate solution obtained by dissolution of residual copper ammonium acetate in the aqueous ammonia is discharged through line 72, and may be reconcentrated as described in my copending application mentioned previously.

By way of illustration, the following example is given: Liquid butadiene-containing hydrocarbon mixture was fed into the absorber 11 at a rate of 356 barrels/day and was counter-currently contacted with aqueous copper ammonium acetate solution, which was introduced into the absorber at 20,000 b/d. The liquid hydrocarbon had the following analysis: 48.6 mol per cent butadiene, 48.9 mol per cent butenes, 0.5 mol per cent acetylenes, and small amounts of lighter and heavier hydrocarbons. The aqueous copper ammonium acetate solution contained 10.6 molar ammonia, 3.10 molar total copper (including 0.40 molar of cupric), and 3.9 molar of acetate (calculated as acetic acid). About 174 b/d of butene raffinate was rejected from the absorber by the absorbing solution. The rich solution containing absorbed butadiene and acetylenes was introduced into the desorber 21, the conditions in the bottom thereof being maintained at 180° F. by means of a reboiler and 12 p. s. i. Butadiene of better than 99.6 mol per cent purity and containing only about 0.007% acetylenes was taken overhead at a rate of 181 b/d and passed through a compressor 24 capable of increasing the pressure sufficiently to pass the butadiene vapor through the water scrubber 26 and to cause liquifaction in the condenser 25 at about 49° F. and about 10 p. s. i.

Lean solution containing about 0.008% butadiene was withdrawn from the desorber 21 through bottom line 28 and passed to the polymerizing time tank, wherein the solution remained for about 70 minutes at 180° F.

The polymer-bearing solution was then filtered in a Sweetland filter to remove solid polymers and other undesirable solids. The filtrate was then washed with about 5% of its volume of butene raffinate to remove liquid polymers from the copper ammonium acetate solution. Under the above conditions of polymerization and acetylene content in the feed, about 2% by weight of liquid polymers were dissolved in the butene during the washing step. The purified solution was then cooled and recirculated to the absorber.

I claim as my invention:

1. An improved copper ammonium acetate absorption and purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes, subsequently desorbing butadiene from said rich solution at a temperature between about 160° and 200° F. and at a pressure below about 18 p. s. i. gauge, whereby a lean solution substantially free of butadiene is obtained, exposing said lean solution to conditions causing polymerization of acetylenes, and removing resulting polymers from the exposed solution.

2. The process of claim 1, wherein the desorbed butadiene vapor is boosted in pressure, washed with water to remove ammonia, and condensed at a temperature above ice formation.

3. The process of claim 1, wherein the solid polymers formed by polymerization are removed by filtration.

4. The process of claim 1, wherein said exposed solution is passed through an enclosed pressure filter to remove solid polymers.

5. An improved copper ammonium acetate absorption purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes, subsequently desorbing butadiene from said rich solution at a temperature between about 160° and 200° F. and at a pressure of 8–18 p. s. i. gauge, whereby a lean solution substantially free of butadiene is obtained, exposing said lean solution to conditions causing polymerization of acetylenes, and removing resulting polymers from the exposed solution.

6. The process of claim 5, wherein the desorbed butadiene vapor is washed with water to remove ammonia and is liquefied in a condensing zone at a temperature of 40–60° F., the pressure of the butadiene vapor being sufficiently increased before water washing to obtain a pressure in the condensing zone sufficient to cause liquifaction at said temperature therein.

7. An improved copper ammonium acetate absorption and purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes, subsequently desorbing butadiene from said rich solution at a temperature between about 160° and 200° F. and at a pressure below about 18 p. s. i. gauge, whereby a lean solution substantially free of butadiene is obtained, exposing said lean solution to conditions causing polymerization of acetylenes, and washing said exposed solution with liquid aliphatic hydrocarbons having from 4 to 10 carbon atoms.

8. An improved copper ammonium acetate absorption and purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes, subsequently desorbing butadiene from said rich solution at a temperature between about 160° and 200° F. and at a pressure below about 18 p. s. i. gauge, whereby a lean solution substantially free of butadiene is obtained, exposing said lean solution to conditions causing polymerization of acetylenes, and washing said exposed solution with a liquid containing aliphatic unsaturated hydrocarbons having from 4 to 10 carbon atoms.

9. An improved copper ammonium acetate absorption and purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes, subsequently desorbing butadiene from said rich solution at a temperature between about 160° and 200° F. and at a pressure below about 18 p. s. i. gauge, whereby a lean solution substantially free of butadiene is obtained, exposing said lean solution to conditions causing polymerization of acetylenes, and washing said exposed solution with liquid butene.

10. An improved copper ammonium acetate absorption and purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes, subsequently desorbing butadiene from said rich solution at a temperature between about 160° and 200° F. and at a pressure below about 18 p. s. i. gauge, whereby a lean solution substantially free of butadiene is obtained, exposing said lean solution to a temperature of 165° to 195° F. for 50 to 100 minutes to cause polymerization of acetylenes, and removing resulting polymers from the exposed solution.

11. An improved copper ammonium acetate absorption and purification method for separating butadiene from a hydrocarbon mixture containing it together with butenes and small amounts of acetylenes, comprising the steps of contacting said mixture with a solution of copper ammonium acetate to obtain a rich solution containing butadiene and acetylenes and subsequently desorbing butadiene from the rich solution at a temperature between about 160–200° F. and at a pressure below about 18 p. s. i. gauge, whereby a lean solution substantially free of butadiene is obtained, exposing said lean solution to conditions causing polymerization of acetylenes, filtering the exposed solution to remove solid polymers, washing the filtered solution with liquid aliphatic hydrocarbons having from 4 to 10 carbon atoms to remove liquid polymers, and returning the washed solution to said contacting step.

12. An improved copper ammonium acetate absorption and purification method for separating butadiene from hydrocarbon mixtures containing butadiene, butenes, small amounts of lower acetylenes, etc., comprising the steps of contacting said mixture with an aqueous solution of copper ammonium acetate to obtain a rich solution containing butadiene and acetylenes, subsequently desorbing butadiene from said rich solution at a temperature of about 160°–200° F. at a pressure below about 18 p. s. i. gauge, whereby a lean solution substantially free of butadiene is obtained, then exposing said lean solution to conditions causing polymerization of acetylenes, filtering said exposed solution through an enclosed pressure filter to remove solid polymers and then washing said filtered solution with butenes to remove liquid polymers, and returning the washed solution to the contacting step.

13. An improved method of purifying an aqueous solution of copper ammonium acetate contaminated with small amounts of acetylenes, comprising exposing said solution to conditions causing polymerization of acetylenes, filtering said exposed solution to remove solid polymers and washing the filtered solution with liquid aliphatic unsaturated hydrocarbons having from 4 to 10 carbon atoms to remove liquid polymers.

14. An improved copper ammonium acetate absorption and purification method of separating butadiene from hydrocarbon mixtures containing butadiene, butenes, small amounts of acetylenes, etc., comprising the steps of contacting said mixture with an aqueous solution of copper ammonium acetate to obtain a rich solution containing butadiene and acetylenes, subsequently desorbing butadiene from said rich solution at a temperature of about 160°-200° F. and 8 to 18 p. s. i. gauge, whereby a lean solution substantially free of butadiene is obtained, exposing the acetylene-containing lean solution to a temperature of 165°-195° F. for 50 to 100 minutes to cause the polymerization of the acetylenes to solid and liquid polymers, filtering said exposed solution in an enclosed pressure filter to remove solid polymers, washing said filtered solution with butenes to remove liquid polymers and returning the washed solution to said contacting step.

ALFRED W. FLEER.

Disclaimer 2,383,784.—*Alfred W. Fleer*, San Francisco, Calif. COPPER AMMONIUM ACETATE EXTRACTION AND PURIFICATION METHOD. Patent dated Aug. 28, 1945. Disclaimer filed Oct. 21, 1950, by the assignee, *Shell Development Company*.

Hereby disclaims from claims 1, 2, 3, 4, 5, 6, and 10 any method covered by said claims except wherein the removal of the polymers from the lean solution is effected by washing said solution, after exposure to conditions causing polymerization of the acetylenes present therein, with liquid aliphatic hydrocarbons having 4 to 10 carbon atoms, said washing being effected in a zone which is separate and distinct from that in which the hydrocarbon mixture is contacted with the copper ammonium acetate solution for the selective absorption of the butadiene;

and further disclaims from claims 7, 8, 9, and 13 any method covered by said claims wherein the washing of the lean solution, after exposure to acetylene polymerization conditions, is not effected in a zone separate and distinct from that in which the hydrocarbon mixture is contacted with the copper ammonium acetate solution for the selective absorption of butadiene.

[*Official Gazette November 21, 1950.*]